United States Patent Office 3,538,752
Patented Nov. 10, 1970

3,538,752
ULTRASONIC THICKNESS MEASURING APPARATUS
Hillel Weinbaum, Houston, Tex., assignor to American Machine & Foundry Company, New York, N.Y., a corporation of New Jersey
Filed Dec. 2, 1966, Ser. No. 598,774
Int. Cl. G01n 29/04
U.S. Cl. 73—67.9       3 Claims

ABSTRACT OF THE DISCLOSURE

The present invention pertains to ultrasonic inspection equipment for using the output of a ramp generator and hold circuit as a means for indicating the thickness of an article, the on-time of the ramp generator being controlled by a signal derived directly from an energizer and the off-time of the ramp generator being controlled by a signal reflection from the back surface of the article following transmission into the article by appropriate means of the signal from the energizer, provisions being made to ignore the front surface reflection.

---

This invention relates to ultrasonic inspection deviecs and more specifically to a simplified inspection device that is readily made portable for making spot thickness measurements.

Ultrasonic inspection devices have in the past required one or more complexities that have made them either unsuitable or at least cumbersome for use as spot checking thickness apparatus. For instance, many prior devices have utilized liquid as a coupling medium between the transmission and receive transducers and the surface of the measured article. Some devices have required the placement of the transmission transducers adjacent one surface of an article and the receive transducer adjacent the opposite surface, limiting the use of such devices to articles having opposite surfaces readily available for the placement of the transducers.

Still other devices have utilized an oscilloscope to present reflected wave patterns so that discrimination in the patterns could be observed and so that measurements could be made from the patterns corresponding to reflections from the surface of the article.

Therefore, and advantageous feature of the present invention is the use of convenient and standard circuits that are capable of economical manufacture in small packages to provide a portable-size ultrasonic spot checker.

Another feature of the present invention is the providing of an easily used, portable-size ultrasonic spot checker that employs a meter for reading the thickness directly in terms of standard units of measurement.

Yet another feature of the present invention is to provide a portable-size ultrasonic spot checker that indicates in go-no-go fashion when the thickness of an article is below a desired standard.

In prior devices utilizing ultrasonic reflections from an article to make measurements, there has been a preference to use a two-crystal probe assembly; that is, one having a transducer for transmitting the energy and one for receiving the reflected energy. The reason for this preference is natural since the circuits connected to each of the two crystals may be readily and effectively isolated from one another without having to time share the operation of a single crystal.

It may be seen that ideally in a measuring scheme wherein a transmission and a receive transducer are both located adjacent the same surface of the article and using reflections from the front and back surfaces of an article, it would be preferable to measure directly the distance between a front surface reflection and a back surface reflection. Although this may be achieved in a measuring circuit employing an oscilloscope, in using a regular dial-type meter such a scheme is impractical since an automatic reflection selecting circuit cannot differentiate between a front and a back surface reflection. Also, even though physical positioning and shielding can minimize the direct energizing (without reflection) of the receive transducer by the transmission transducer, it is still possible for there to be some leakage between the two so as to falsely operate equipment merely counting responses.

Still another advantageous feature of the present invention, therefore, is to provide a circuit that is made operable at a time later than the time of front surface reflections (following energizing of a transmission transducer and receipt of reflections by a receive transducer) so that direct and front surface reflections received by the receive transducer can have no direct effect on the meter. It may be seen that the metering function in the present invention is controlled by a signal derived from the production of the energy and a signal derived from the back surface reflection of that produced energy with a time delay constant added to compensate for the time difference between the energy's production and the time that that energy is reflected off the front surface. Since the front surface is always the same distance from the transmission and receive transducers, this constant may be obtained with a simple initial calibration of the circuits.

The present invention provides the above and other desirable features by providing in an illustrated embodiment thereof an ultrasonic thickness measuring circuit utilizing transmission and receive transducers suitably placed in a non-liquid couplant on the same or near side of an article to be measured for transmitting acoustical energy into the article and receiving reflections from the far side (and inadvertently from the near side); energizing means in the form of a suitable clock and associated circuitry for energizing the transmitting transducer; ramp generator means, the respective on-occurrence and off-occurrence being controlled by suitable wave-shaping circuits controlled by the output of the energizing means after a preset delay and the far side received reflection to produce a voltage at cutoff related to thickness of the article; and a means for producing a DC voltage added to the ramp voltage so that the meter voltage is indicative of true article thickness, thereby compensating for the fact that the on-occurrence of the ramp generator is not controlled by the near side received reflection.

To such a circuit may be added a minimum thickness indicating circuit comprising AND gate means for receiving an output relating to the received far side reflection and an output from appropriate circuit means that discontinues after a preset delay from the occurrence of an output from the energizing means, such that when both outputs occur simultaneously a signal is produced for lighting a light, etc.

In order that the manner in which the above-recited advantages and objects of the invention, as well as others which will become apparent, are attained can be understood in detail, more particular description of the invention briefly summarized above may be had by reference to the embodiments thereof which are illustrated in the appended drawings, which drawings form a part of this specification. It is to be noted, however, that the appended drawings illustrate only a typical embodiment of the invention and therefore are not to be considered limiting of its scope for the invention may admit to other equally effective embodiments.

Figure 1:
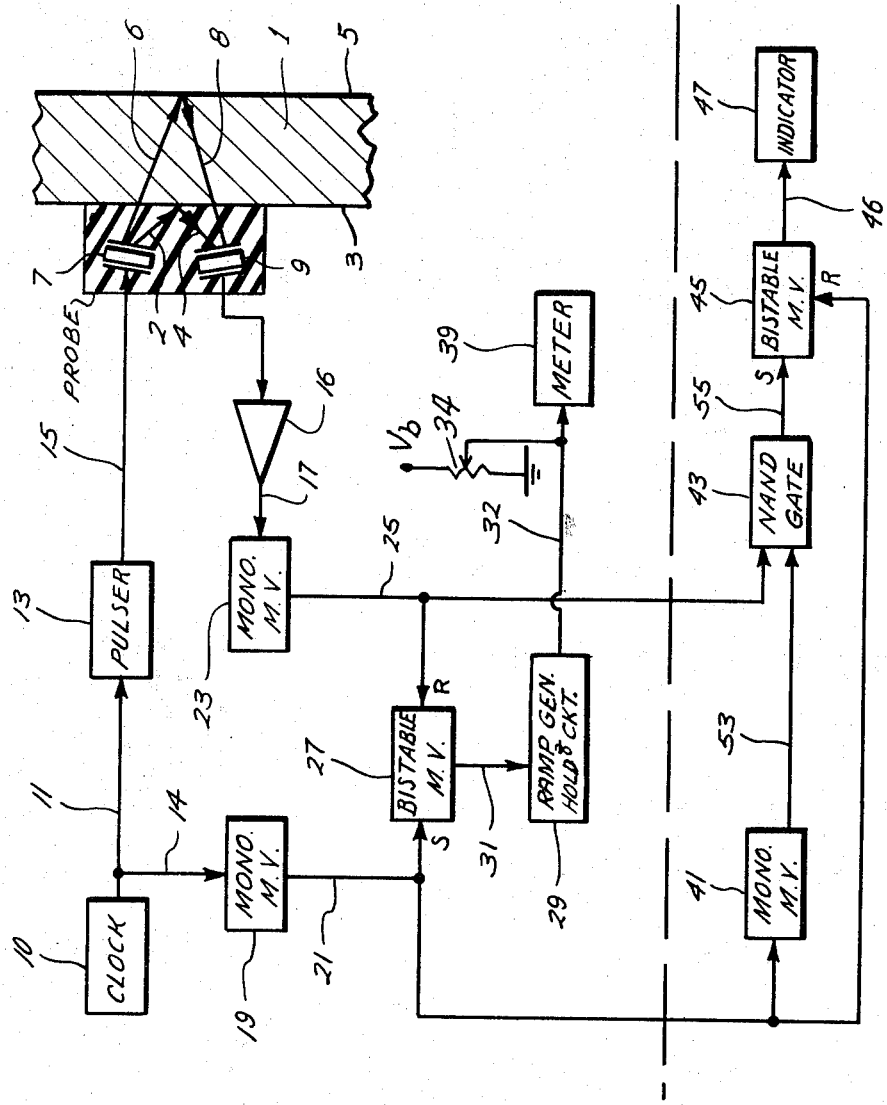
FIG. 1 is a simplified block diagram of an illustrated embodiment of the present invention.

A simplified block diagram of the preferred embodiment of the present invention is shown in FIG. 1. An article 1, the thickness of which is to be measured, has a front surface 3 and a back surface 5, both of which are capable of reflecting ultrasonic acoustical transmitted energy. Typically, article 1 is made of steel, such as may be used in the wall of a storage tank, a pipe used for carrying hydrocarbons, etc. Probes 7 and 9, respectively, the transmission and receive transducers, are preferably each disposed adjacent and opposite the same side of article 1. For convenience of reference, the side of article 1 closest to probes 7 and 9 is referred to as front surface 3 and the side of article 1 away from probes 7 and 9 is referred to as back surface 5. Since many articles are fabricated such that only one side is readily accessible for the placement of probes, a distinct advantage of the embodiment shown in FIG. 1 is that probes 7 and 9 may be so disposed.

The transducer elements used in probes 7 and 9 may be typically piezoelectric crystals so constructed and packaged as to be highly directive. Also, typically, the crystals are both packaged in the same probe assembly, and are coupled to the front surface 3 by a coupling substance (not shown), of such a material that for purposes of discussion it may be considered not to reflect ultrasonic energy or impede its transmission. Almost any type of plastic material having this characteristic and in which the crystals may be encased constitutes a suitable material.

In addition, the substance comprising the housing for the crystals may be considered to have a delay thickness since it places the crystals in the probe assembly a determined distance from the surface of an article against which the assembly is placed for the taking of thickness measurements.

The positional orientation or relationship of the transducer elements with respect to each other are such that when they are in their position of use adjacent and opposite the front surface 3, certain conditions exist that are discussed below. For instance, the transducer element in transmission probe 7 is positioned so as to direct energy 2 at a slight angle with respect to the front and back surfaces of the article in the direction of receive probe 9.

Considering the lateral distance of the two probes to each other, the spatial relationship of the two probes with respect to article 1 and the expected range of thicknesses of article 1, transmission probe 7 and receive probe 9 are preferably optimumly and complementarily oriented to achieve the strongest possible signal for operating the remainder of the circuit, as discussed below. Of course, any orientation of the probes to produce an adequate signal is acceptable.

As will be explained more fully, only an energy path including transmission 6 to and reception 8 from the back surface is required for operation of the electrical circuit. Inevitably, there will be some energy 2 from the transmission probe, which is reflected as energy 4 off the front surface of the article, and there will be some energy received as leakage by probe 9 directly from probe 7.

As an aid in eliminating such spurious transmissions, the transducer elements of both probes should be arranged and shielded from each other to minimize the amount of energy that travels directly from the transducer element in the transmission probe to the transducer element in the receive probe without first being reflected, although complete elimination of all of the undesirable energy is virtually impossible.

The type of orientation of the transducer elements set out above is easily accomplished since the transmission from probe 7 and the reflection to probe 9 are not to be considered in terms of straight lines, but rather in terms of beams having a certain thickness (ray-like). Because of this ray-like characteristic of the transmitted and reflected energies associated with both the front and back surfaces, it is apparent that orientation of the transducers are not critical and that there will be some energy passing between the probes over all possible paths, both direct and off the reflecting surfaces. Even wide variations in article thickness does not render inoperative suitably positioned transducers.

Although, of course, the transducer elements may be movably joined together within separate probes or within a common probe assembly so that positional adjustments can be made, preferably these elements are made immovably fixed with respect to each other.

Figure 2:
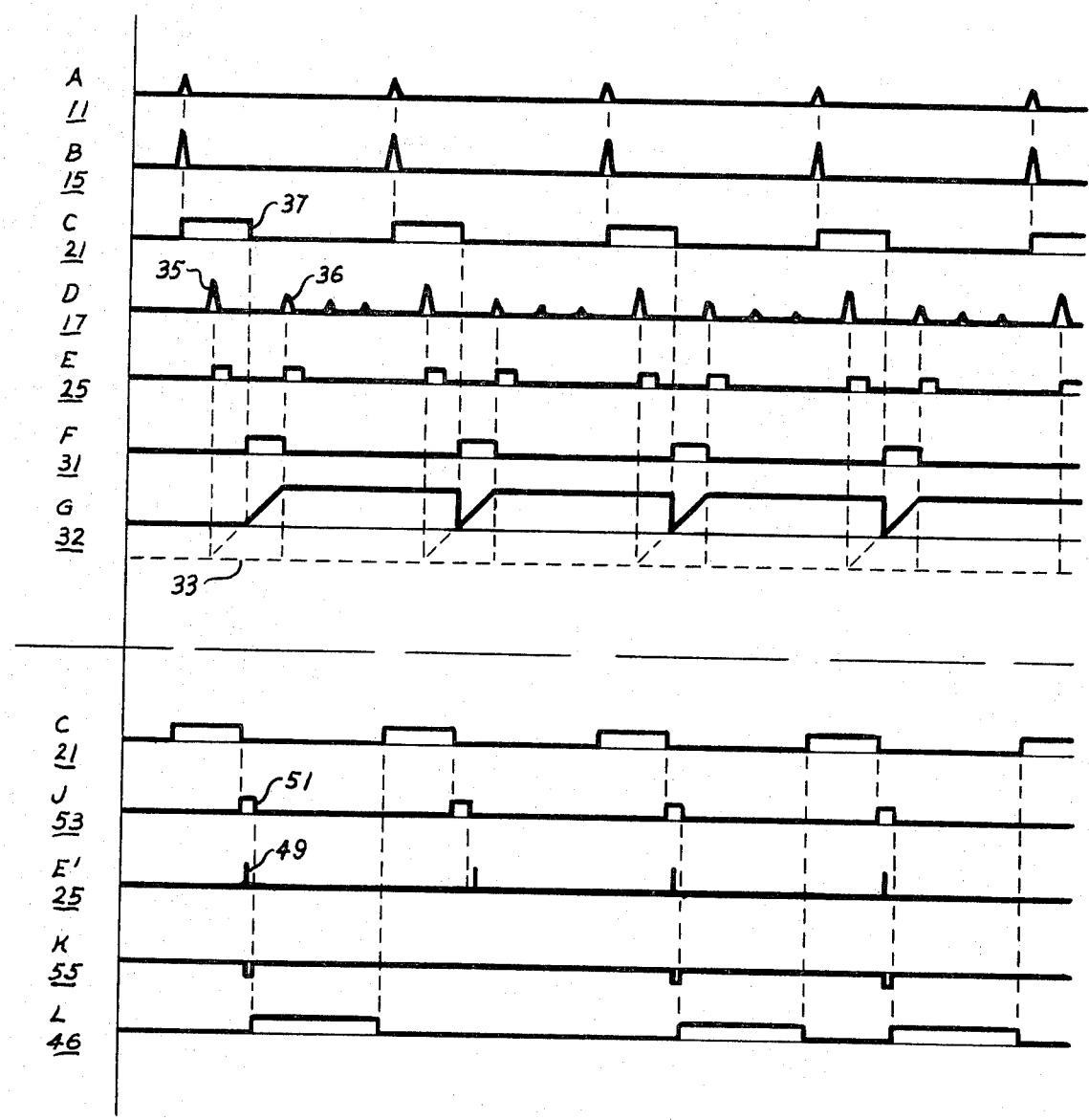
FIG. 2 is a time sequence diagram showing the relative occurrence of the various existing voltages in the illustrated embodiment shown in FIG. 1.

Now referring to the timing diagram shown in FIG. 2 together with the simplified block diagram shown in FIG. 1, the electrical operation of the illustrated ultrasonic thickness measuring circuit may be understood. A clock circuit 10, such as typically an astable multivibrator, is shown which produces short-term pulses (see FIG. 2A) at regular intervals, normally on the order of a few milliseconds apart. This is the nature of the signal produced on lines 11 and 14 of FIG. 1.

A signal on line 11 from clock 10 is applied to pulser circuit 13, a high energy circuit for energizing transmission probe 7. A convenient pulser circuit 13 for energizing tarnsmission probe 7 includes a silicon controlled rectifier (SCR). Such a device represents an open circuit until an appropriate gate signal from clock 10, typically an astable multivibrator, is applied to the gate terminal thereof. Upon such gate signal receipt, the SCR switches substantially instantaneously to the conducting state to produce an appropriate energizing pulse to probe 7. Therefore, output 15 from pulser circuit 13 is a series of pulses coincident in time with the pulses on line 11, but at a much higher level (see FIG. 2B). Of course, other energizing means capable of producing pulses of this nature may be used for energizing transmission probe 7.

Transmission probe 7 includes a transducer element for changing the electrical energy applied thereto to acoustical ultarsonic energy which is applied or transmitted into surface 3 of article 1 as described above, some of the energy also being reflected off back surface 5. Reflections from both the front and back surfaces are received by receive probe 9. It may be noted that the front surface reflection may be expected to be at a higher level than the back surface reflection because the energy is not attenuated by the article. This attenuation is shown in FIG. 2D, a representation of the signal from receive probe 9.

Additional, greatly-attenuated reflections are received by probe 9 as a result of the subsequent reflections of energy back and forth from surface to surface that accompanies each transmission pulse (also shown in FIG. 2D). All received reflections after the first two (even if accidently large enough to exceed the operating threshold of the receiving circuit) are ignored by the timing operation of the circuit, as explained below.

Monstable multivibrator 19 connected to clock 10 by line 14 is put to its electrically unstable condition by a pulse from clock 10. The recovery time of monostable multivibrator 19 is sufficiently long that it does not return to its stable condition until after the reflected energy from the front surface of article 1 is received by receive probe 9. This is indicated by the waveform shown in FIG. 2C, which is the signal developed on output line 21 from multivibrator 19. The waveform there depicted has a trailing or recovery edge 37 occurring in time after the front surface reflection 35 shown in FIG. 2D arrives at probe 9 and before the time occurrence of first back surface reflection 36 at probe 9.

The receive signal on line 17 (the signal from receive probe 9 following amplification in amplifier 16), triggers a monstable multivibrator circuit 23, or other waveshaping means the recovery time of which is very short, as shown in FIG. 2E. This output signal from multivibrator 23 exists on line 25. In fact, it may be noted that the recovery time of monostable multivibrator 23 is so short that it returns to its stable condition before the occurrence of trailing or recovery edge 37 of signal 21 (the output from monostable multivibrator 19).

Bistable multivibrator 27 receives its set input in the form of the signal on line 21 from monostable multivibrator 19 and its reset input in the form of the signal on line 25 from monostable multivibrator 23. A reset pulse on line 25 has no effect on multivibrator 27 until multivibrator 27 is placed in a "set" condition by a pulse on line 21. Therefore, bistable multivibrator 27 is uneffected until the trailing edge of the waveform shown in FIG. 2C occurs, resulting in the changing of state of the output of bistable multivibrator 27. That is, the trailing edge 37 of the positive pulse of FIG. 2C constitutes the set signal for bistable multivibrator 27. The result of this change of state in multivibrator 27 is shown in FIG. 2F, a graphic illustration of the signal on output line 31 from multivibrator 27.

The next reset pulse that occurs following the setting of multivibrator 27 is of the signal that occurs upon receipt of the first reflected energy from back surface 5. Again, it may be noted by observing the waveforms shown in FIGS. 2D, 2E and 2F that a back surface reflected signal causes multivibrator 27 (through the operation of monostable multivibrator 23) to return to its "reset" condition.

It may be noted that bistable multivibrator 27 could not be triggered alternately by the following train of reflected energy pulses as it reached its "reset" state upon the arrival of the first back surface reflection leading edge. It should be noted that the most precise timing results from triggering on the front or leading edge of pulse 36, rather than on a threshold value, etc.

Ramp generator 29, to which the output of bistable multivibrator 27 is connected via line 31, has the characteristic of having an output that is a precisely linearly sloping voltage. At the time that bistable multivibrator 27 receives a set signal on line 21, ramp generator 29 is turned on, as is shown in FIG. 2G. When a reset signal is applied to bistable multivibrator 27, ramp generator 29 is turned off, and a hold circuit (included within the block marked ramp generator) is activated.

At the next set signal on line 21, the hold circuit is deactivated and the ramp generator 29 is again turned on. Since time has elapsed during the hold period, the ramp geneartor has had ample time to completely recover prior to this next set signal and therefore starts from the same initial voltage level as for the first set signal. Again, when the next reset signal is applied to multivibrator 27, ramp generator 29 is again turned off, and the hold circuit is again activated.

This means that the ramp generator provides an output-ramp for the same duration or period of time as the on time for bistable multivibrator 27. Since the ramp voltage (the output from the ramp generator) is linear, the level which it raches at the time the ramp generator is turned off is a direct and proportional measurement of the on time for multivibrator 27. The voltage level that is reached by the output of the ramp generator (at the time it is cut off) may then be made a measure of the thickness of the measured article.

As shown in FIG. 2D, the distance between the front surface reflected pulse 35 (which is *not* used in the circuit, but which is the actual reference point from which measurements are made) and the back surface reflected pulse 36 is a measure of the actual thickness of the measured article. This distance is greater in length than the on time of the ramp generator by an amount that pulse 35 precedes in time trailing edge 37 of output 21 from monostable multivibrator 19. But, of course, when transmission and receive probes 7 and 9 are in their positions of use, the front surface reflected pulse 35 is always going to be a fixed time distance from the pulse from clock 10. Since the clock pulse triggers monostable multivibrator 19, which has a fixed recovery time, edge 37 is always a fixed time distance from the clock pulse. Hence, the time distance between front surface reflected pulse 35 and trailing edge 37 is fixed and independent of the thickness of the measured article.

As mentioned above, the voltage level output from the ramp generator is a direct and proportional measure of the on time for multivibrator 27. The on time of this multivibrator differs from the time between pulses 35 and 36 (the respective front and back surface reflections of the measured article and a true measure of the article's thickness) by a time difference amount between pulse 35 and trailing edge 37. Therefore, as is shown in FIG. 2G, a DC voltage 33 indicative of the distance between the front surface reflecting energy pulse 35 and the recovery occurrence (time of trailing edge 37) of monostable multivibrator 19 is added to the ramp voltage to give a total output voltage 32 to an indicating circuit which is a true measure of article thickness. This DC voltage 33 may be taken from a potentiometer 34, FIG. 1, which is coupled to a biasing voltage source V$b$ and combined with the ramp voltage on line 32.

Since total output voltage 32 to the meter or indicator must be a true measure of the article's thickness, DC voltage 33 must be compatible with the ramp voltage or scaled similarly therewith so that the proportional relationship of total voltage 32 to thickness is maintained over the entire range of measurable thicknesses.

Moreover, it should be noted that the minimum thickness that can be measured is determined by the pulse-35-to-trailing-edge 37 time distance (the distance that corresponds to the thickness represented by DC voltage 33), since if pulse 36 occurs prior to edge 37, there would be no ramp voltage to measure, as explained above.

The same effect as adding a DC voltage 33, as discussed above, may be achieved by applying the output of the ramp generator to a meter 39 biased by the DC voltage 33. The meter deflection is then a direct measure of the time distance between pulse 35 and pulse 36. Of course, indicators other than a meter may also be used.

It is easily recognized, however, that if meter 39 takes the form of a dial-type instrument, having for instance a D'Arsanvol movement, the meter may be calibrated in convenient units of measurement to give a direct reading of the article's thickness.

In making thickness measurements in view of the above, the importance that the probes always are placed the same distance from the front surface is readily apparent. This may be assured by making certain that the front surface is clean and by pressing the probe assembly firmly in contact therewith. Such a procedure assures that the pulse-35-to-trailing-edge-37 is truly the same for all measurements.

A circuit such as shown in block-diagram form in the bottom part of FIG. 1 may be used if it is desired to incorporate in the circuit a warning system to indicate when the measured article has decreased in thickness at the point of measurement below a predetermined thickness. The group of circuits there shown includes adjustable width monostable multivibrator 41, NAND gate 43, bistable multivibrator 45 and indicator 47. Monostable multivibrator 41 receives its input from output 21 of monostable multivibrator 19 such that it is triggered by the recovery occurrences thereof (trailing edge 37). Monostable multivibrator 41 has a response period which is dependent upon the predetermined minimum thickness to be indicated. More specifically, the time between the receipt of the front surface transmission 35 and trailing edge 51 of the signal from monostable multivibrator 41 (happening at the recovery occurrence thereof) is a measure of the minimum thickness. How this information is used in an indicating scheme is set out in detail below.

For purposes of discussion it is first assumed that the leading edge of the output from monostable multivibrator 23 corresponding to the first back surface reflection occurs at edge 49 (the leading edge only is shown for convenience of discussion) precedes in time trailing edge 51. For convenience, the first showing of an edge 49 is diagrammed in FIG. 2E' to appear before its functionally related edge 51. It is then assumed that edge 49 occurs in time following trailing edge 51. The second showing of edge 49 is diagrammed to appear after its related edge 51. Note, that both assumptions cannot occur simultaneously.

Assume first that the energy reflected off back surface 5 is received before monostable multivibrator 41 recovers, such as shown in the first set of waveforms in FIGS. 2J, 2E', 2K and 2L, which correspond respectively to signals occurring on line 53 from multivibrator 41, on line 25 from multivibrator 23, on line 55 from NAND gate 43 (an AND gate plus an inverter), and on line 46 from multivibrator 45. When such a thing happens, there is an output from monostable multivibrator 41 to NAND gate 43 on line 53 and also an output on line 25 to NAND gate 43. When both conditioning inputs to NAND gate 43 occur simultaneously, there will be an output produced from NAND gate 43 on line 55, which output will be inverted as shown in FIG. 2K. The output from NAND gate 43 is then used to trigger a bistable multivibrator 45 which, in turn, triggers the indicator circuit 47 by producing an output 46 as shown in FIG. 2L, thereby indicating that the measured article is below an acceptable minimum thickness.

Indicator 47 shows an indication that both conditions exist until the next pulse from clock 10 occurs, which is reflected as the leading edge of the output 21 from clock-controlled multivibrator 19, which output is connected as the reset input to multivibrator 45. When multivibrator 45 is reset, signal 46 to indicator 47 is shut off.

Now assume that an article 1 is measured having a thickness in excess of the minimum acceptable wall thickness. When this is the case, energy reflected from the back surface of the article occurs at a time after monostable multivibrator 41 has recovered (after edge 51), as is shown in the second set of waveforms in FIGS. 2J, 2E', 2K and 2L. Hence, there is only one output applied at a time to NAND gate 43, as the two inputs at no point in time overlap; there is no output signal from NAND gate 43 for setting bistable multivibrator 45; and hence there is no output to the indicating circuit. In brief summary of the operating results, it may be seen that when the article 1 thickness is an acceptable thickness, there is no indication and when article 1 is less than the minimum acceptable wall thickness, there is an indication. Indicator 47 may be a light or any other convenient means capable of operating in this go-no-go fashion.

Monostable multivibrator may include therewith a recovery-time adjustment, thereby permitting the minimum acceptable wall calibration circuit comprising monostable multivibrator 41, NAND gate 43, bistable multivibrator 45 and indicator 47 to be used for indicating articles of different minimum wall thickness, as desired.

In all of the foregoing discussion, it may be noted that measurements are actually made using transmission and receive beams that are at a slight angle to the normal of the front surface of the measured article. For practical purposes, however, any slight variation from actual thickness measurement because of this may be compensated for by any of a number of calibrating means (such as calibration on an article of known thickness).

While only one embodiment of the invention has been described, it is obvious that various substitutes or modifications of structure may be made without varying from the scope of the invention.

What is claimed is:

1. An ultrasonic thickness measuring circuit for measuring the thickness of an article having a front surface and a back surface which reflects ultrasonic acoustical energy, comprising
   a first transducer disposed adjacent the front surface of the article for transmitting ultrasonic energy into the article,
   a second transducer disposed adjacent the front surface of the article for receiving ultrasonic energy reflected from the front surface and from the back surface of the article,
   said transducers being packaged in a probe assembly and coupled to said front surface by a plastic material which does not substantially reflect or impede the transmission of ultrasonic energy,
   means for energizing said first transducer, the time between the transmission of energy from said energizing means and its receipt by said second transdcuer after reflection from the front surface being predetermined,
   a monostable multivibrator set by the output from said energizing means and having a recovery time in excess of said predetermined transmission-to-front-surface receive time,
   a bistable multivibrator set by the output from said monostable multivibrator upon the recovery thereof and reset upon the receipt by said second transducer of the reflected ultrasonic energy from the back surface of the article,
   a ramp generator having a precisely linear sloping voltage output, said ramp generator being turned on and off by the respective setting and resetting of said bistable multivibrator,
   circuit means for providing an output voltage which is a function of the magnitude of said sloping voltage output at the time of turn-off of the ramp generator,
   means for providing a D.C. biasing voltage having a magnitude proportioned to correspond to the time by which the recovery time of said monostable multivibrator exceeds said predetermined time,
   means for combining the output voltage of said circuit means and said D.C. biasing voltage, whereby the combined voltages are a true indication of the thickness of the article, and
   means for providing an indication of said combined voltages.

2. An ultrasonic thickness measuring circuit as defined in claim 1 and further including,
   a second monostable multivibrator set by the recovery occurrence of said first-named monostable multivibrator, said second monostable multivibrator having a recovery time such that its recovery occurrence occurs at the time of receipt by said second transducer of energy reflected from the back surface of an article of desired minimum thickness, and
   AND gate means for receiving the output from said second monostable multivibrator and said second transducer for producing an output when the reflected ultrasonic energy from the back surface of the article occurs before the recovery occurrence of said second monostable multivibrator, thereby producing a signal when the article is below a minimum thickness.

3. An ultrasonic thickness measuring circuit for measuring the thickness of an article having a front surface and a back surface which reflects ultrasonic acoustical energy, comprising
   transducer means disposed adjacent the front surface of the article for transmitting ultrasonic energy into the article and for receiving energy reflected back to the transducer means from the back surface,
   means for energizing the transducer means whereby ultrasonic energy is directed into said article,
   ramp generator means having a linear sloping voltage output,
   delay means responsive to the output of the energizing means and coupled to said ramp generator means to turn on the ramp generator after a predetermined delay which is in excess of the transit time of ultrasonic energy from said transducer means to the front surface of said article and back to the transducer means, and means coupled to the transducer means for coupling energy reflected from the back surface of the article to said ramp generator means, said ramp generator means being turned off by energy reflected from the back surface of said article and coupled thereto, the voltage level of said ramp generator means at turn off being an indication of article thickness.

References Cited

UNITED STATES PATENTS

| | | | |
|---|---|---|---|
| 2,888,824 | 6/1959 | Henry | 73—67.9 |
| 3,068,370 | 12/1962 | McInnish | 73—67.7 XR |
| 3,164,007 | 12/1965 | Stebbins et al. | 73—67.9 |
| 3,169,393 | 2/1965 | Stebbins | 73—67.9 |
| 3,282,086 | 11/1966 | McCorkindale et al. | 73—67.8 |
| 3,427,866 | 2/1969 | Weighart | 73—67.7 |

RICHARD C. QUEISSER, Primary Examiner

J. P. BEAUCHAMP, Assistant Examiner